March 1, 1955  H. F. ARGENTO  2,703,079
METHOD OF AND APPARATUS FOR DETERMINING
THE OXYGEN CONTENT OF A GAS
Filed Aug. 13, 1951
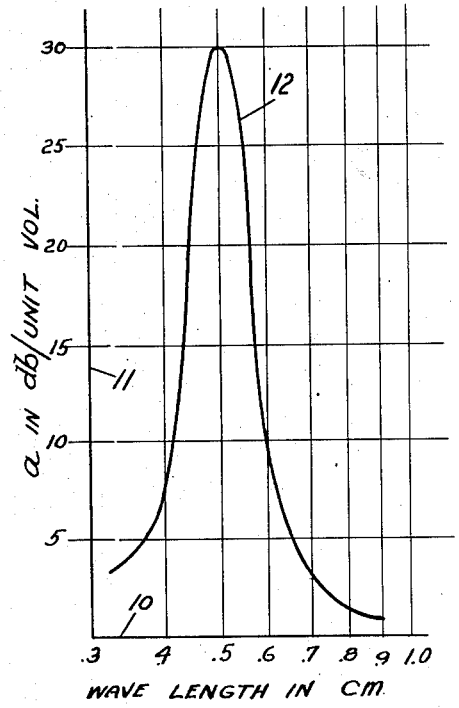
FIG. 1
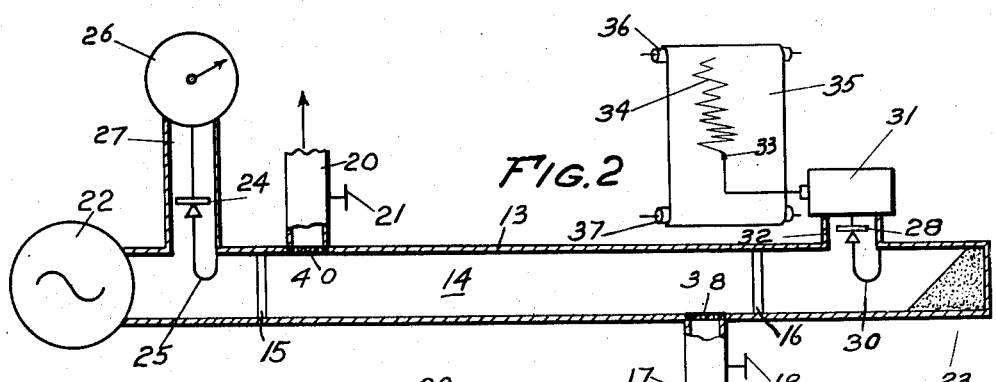
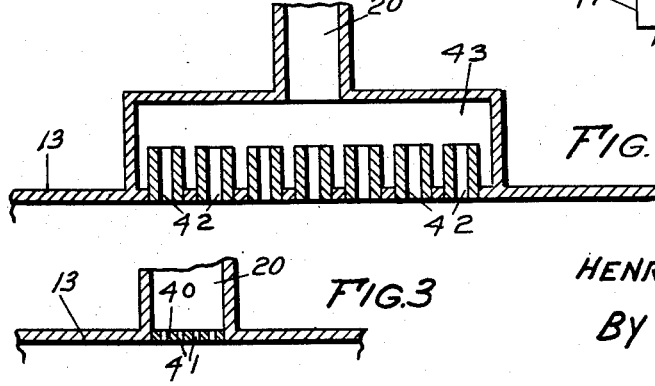
INVENTOR
HENRY F. ARGENTO
BY Elmer J. Gorn
ATTORNEY

United States Patent Office 2,703,079
Patented Mar. 1, 1955

2,703,079

METHOD OF AND APPARATUS FOR DETERMINING THE OXYGEN CONTENT OF A GAS

Henry F. Argento, Newtonville, Mass., assignor to Raytheon Manufacturing Company, Newton, Mass., a corporation of Delaware Application August 13, 1951, Serial No. 241,574

14 Claims. (Cl. 128—2.07)

This invention relates to methods of and apparatus for determining the oxygen content of a gas particularly before and after it has been used for a process, such as breathing.

It is useful to be able to determine how much oxygen is contained in a given atmosphere before and after it is used in a process, such as breathing. In the case of breathing, it is desirable to obtain an indication of the percentage of the oxygen available in the inhaled air as compared to the concentration in the exhaled air so that the rate at which the organism uses oxygen in the basal metabolism process may be determined.

By present methods of testing basal metabolism, a device known as a spirometer is used which holds a measured quantity of oxygen. This oxygen is inhaled and exhaled through a closed system that is kept saturated with water vapor. Means are provided to absorb the exhaled carbon dioxide, the main product of the metabolism process. The result of breathing in such a closed system is that the quantity of oxygen in the spirometer is reduced after each breath. When reduction of the oxygen in the system over the period of the test, usually six to eight minutes, is read off the spirometer and averaged over the number of minutes of the test, the result can be expressed in milliliters of oxygen used per minute. By known relationships this figure is converted to calories per square meter of body area per hour, and, by comparison with the average for an adult male, for instance, of 39.5 calories per square meter per hour, the deviation can be expressed in a percentage of the normal. By the method of the present invention, a simple comparison of a set of meter readings will give the desired information about the rate of consumption of oxygen with considerable saving in time once the equipment has been calibrated.

The present invention utilizes the phenomenon disclosed in the application for United States patent of Norman R. Wild and Huston W. Cockrill, Serial No. 635,560, filed December 17, 1945, of the absorption of electromagnetic energy of a certain critical frequency in the microwave region by molecular oxygen. Not only can the presence of molecular oxygen be detected by this means, but its concentration within the field of microwave energy of the critical frequency can be measured by comparing the attenuation of microwave energy at this critical frequency of the same initial power passed through an atmosphere of pure oxygen at a given pressure with the attenuation of such microwave energy of the same initial power passed through the atmosphere under test at the same pressure.

In the process of the present invention, the precise measurement of the percentage of molecular oxygen present in the atmosphere under test is not necessary. What is desired is an accurate indication of the rate at which the oxygen available in the atmosphere used in the process is being consumed in the process. The amount by which the microwave energy of the critical wave length is attenuated in passing through the atmosphere under test is a measure of the amount of oxygen present in that atmosphere. When the sample is inhaled, or used in a process, a certain amount of oxygen is used up by the organism to combine with carbon to form carbon dioxide and other compounds, part of which is exhaled. While these compounds contain oxygen, they do not absorb the microwave energy to the same extent at the same critical frequency as the original molecular oxygen. The result is that, when the sample is exhaled, it contains less molecular oxygen, and the same quantity will attenuate radio energy of the critical frequency to a lesser extent. Thus a power-measuring device coupled into the opposite end of a space into which radio energy at the critical frequency for oxygen is injected will give a certain reading for a sample of air before it is inhaled, and a higher reading for a sample of the same quantity of air after it is exhaled. The relationship of the readings is an indication of what percentage of the molecular oxygen in the inhaled sample atmosphere has been used up in the physiological processes associated with breathing.

By the present invention, a sample of atmosphere to be inhaled by the organism is introduced into a transmission line, preferably a wave guide suitable for propagating radio energy of the critical frequency for molecular oxygen, and radio energy at this frequency is propagated down the transmission line to a detecting device coupled to a meter to indicate the energy reaching the detecting device. When the sample is inhaled and then exhaled back into the transmission line, the meter indicates a greater amount of energy reaching the detecting device due to the lesser quantity of molecular oxygen present in the exhaled air, as explained above. The result is an indication of the portion of the available oxygen used up by the organism in the breathing process. When the time between successive readings is known, the rate of oxygen use can be determined.

Other and further advantages of this invention will be apparent as the description thereof progresses, reference being had to the accompanying drawings, wherein:

Fig. 1 is a graph of the attenuation in decibels per unit volume of microwave energy in the half centimeter region by molecular oxygen;

Fig. 2 is a schematic diagram of a preferred embodiment of the apparatus of the present invention;

Fig. 3 is a detail of one method used to prevent the loss of radio energy from the wave guide into the gas transmission system; and Fig. 4 is a detail showing a second method for preventing such loss.

In Fig. 1 the various wave lengths from 0.3 to 1.0 centimeter are indicated along the abscissa 10 and the attenuation in decibels per unit volume along the ordinate 11. The graph 12 shows how the attenuation varies with frequency in an atmosphere of molecular oxygen. It will be seen that the attenuation rises rapidly to a sharp peak at a wave length of half a centimeter.

It has been found that the attenuation at this wave length increases as the concentration of molecular oxygen within the electromagnetic field becomes greater. Fig. 2 shows the apparatus by which this phenomenon is utilized by the methods of this invention to determine how much of a given sample of molecular oxygen is used up in a process, such as breathing.

This apparatus comprises a section of transmission line 13, preferably a wave guide of any of the well-known types, preferably hollow, that has a space 14 separated from the rest of the interior of the wave guide by sheets 15 and 16 of material such as glass, that will not pass oxygen and other gases, but will permit radio energy at the desired frequency to pass through with a minimum of loss. An atmosphere containing molecular oxygen is introduced into this space through a tube 17 fitted with a valve 18 that is opened to admit a sample of the desired atmosphere, such as the surrounding air. The sample thus collected is inhaled or fed to the processing chamber through a tube 20 fitted with a valve 21 that is opened when the equipment is in use, and closed at other times.

When the space 14 is filled with a sample of the desired atmosphere, electromagnetic energy at the desired wave length of half a centimeter is propagated through it by a generator 22 of suitable design, preferably of the velocity modulation type, such as a magnetron or klystron. This propagated energy, after passing through the sample 14, is absorbed by a suitable load, such as a wedge 23 of material having the property of rapidly attenuating any radio frequency energy penetrating it. This wedge 23 is inserted in the opposite end of the wave guide 13 from the point at which power from the generator 22 is injected.

A detecting device 24, such as a silicon crystal, is coupled into the wave guide 13 ahead of the space 14 by any suitable device, such as a loop 25. The output of the detector 24 is fed to a meter 26 through a transmission line 27, preferably a coaxial cable.

A second detecting device 28, similar to the device 24, is coupled into the wave guide 13 between the partition 16 and the load 23 by a loop 30 that may be similar to the loop 25. The output of the detector 28 is fed to a meter 31 through a transmission line 32, preferably a coaxial cable. The meter 31 is preferably of the recording type operating a pen arm 33 which inscribes a line 34 on a roll of paper 35 carried beneath the arm 33 by drums 36 and 37 that may be suitably driven in the well-known manner.

To perform a test, the valve 21 is closed and the valve 18 is open to permit a sample of the surrounding atmosphere containing molecular oxygen to be introduced into the space 14. When the space 14 is filled, the valve 18 is closed and the oscillator 22 is placed in operation. The reading of the meter 26 is then noted. The pen arm 33 of the meter 31 will indicate some lesser value on the paper 35. The valve 21 is open and the sample contained in the space 14 is inhaled by the subject or transferred to the region where the operation understudy is performed. A pump may be necessary for this operation. When the breathing or operation is completed, the sample is exhaled or otherwise transmitted back to the space 14 and the valve 21 closed. At this time another reading of the meter 26 is taken and compared with the previous reading to determine if there has been any change in the injected power. The arm 33 will indicate a higher reading as the energy will have gone through less oxygen and so have been less attenuated. A comparison of the readings of the arm 33 gives an indication of the amount of molecular oxygen used in the breathing or other process.

For a quantitative measurement, the space 14 may be filled with pure molecular oxygen at the same pressure as the sample to be tested, or at a known pressure with proper adjustments for any differences in pressure between the pure oxygen sample and the sample to be tested.

To prevent the loss of microwave energy through the tubes 17 and 20, disks 38 and 40 having a plurality of small openings 41, as shown in Fig. 3, may be inserted in the tubes 17 and 20. These openings 41 are each too small to permit energy at half a centimeter wave length to be propagated through them into the tube 17 or 20. The same result can be obtained by using a plurality of passages 42 too small in diameter to permit the propagation of electromagnetic energy through them. These passages open into a common manifold 43 connected to either the input tube 17 or the output tube 20, as shown in Fig. 4.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. The method of measuring the amount of molecular oxygen in a sample of gas consumed in a process, comprising the steps of exposing a sample of the gas before use to electromagnetic energy of a critical wave length characteristic of oxygen, at which a strongly selective absorption of said energy occurs using the sample in the process, exposing the sample of the gas after use to electromagnetic energy of the said critical wave length and measuring and recording the energy passed through the gas to give measurements that may be compared to determine the difference in absorption of the energy by the sample before and after it is subjected to the process, thus giving an indication of the proportion of the molecular oxygen consumed in the process.

2. The method of measuring the amount of molecular oxygen in a sample of gas consumed in a process, comprising the steps of exposing a sample of the gas before use to electromagnetic energy of a critical wave length characteristic of oxygen, at which a strongly selective absorption of said energy occurs, said critical wave length being longer than about 0.1 centimeter, using the sample in the process, exposing the sample of the gas after use to electromagnetic energy of the said critical wave length and measuring and recording the energy passed through the gas to give measurements that may be compared to determine the difference in absorption of the energy by the sample before and after it is subjected to the process, thus giving an indication of the proportion of the molecular oxygen consumed in the process.

3. The method of measuring the amount of molecular oxygen in a sample of gas consumed in a process, comprising the steps of exposing a sample of the gas before use to electromagnetic energy of a critical wave length characteristic of oxygen, at which a strongly selective absorption of said energy occurs, said critical wave length being 0.5 centimeter, using the sample in the process, exposing the sample of the gas after use to electromagnetic energy of the said critical wave length and measuring and recording the energy passed through the gas to give measurements that may be compared to determine the difference in absorption of the energy by the sample before and after it is subjected to the process, thus giving an indication of the proportion of the molecular oxygen consumed in the process.

4. The method of measuring the amount of molecular oxygen in a quantity of air consumed by an organism in breathing, comprising the steps of exposing a sample of air to be inhaled to electromagnetic energy of a critical wave length, characteristic of oxygen, at which a strongly selective absorption of said energy occurs, measuring and recording the energy passed through the air, permitting the sample to be inhaled and exhaled by the organism, exposing the sample of air after exhaling to electromagnetic energy of the critical wave length of oxygen and measuring and recording the energy passed through the air, to give readings that may be compared to indicate the difference in absorption of the energy by the sample before and after it is breathed, thus giving an indication of the proportion of the molecular oxygen consumed in the process.

5. The method of measuring the amount of molecular oxygen in a quantity of air consumed by an organism in breathing, comprising the steps of exposing a sample of air to be inhaled to electromagnetic energy of a critical wave length, characteristic of oxygen, at which a strongly selective absorption of said energy occurs, said critical wave length being longer than about 0.1 centimeter, measuring and recording the energy passed through the air, permitting the sample to be inhaled and exhaled by the organism, exposing the sample of air after exhaling to electromagnetic energy of the critical wave length of oxygen and measuring and recording the energy passed through the air, to give readings that may be compared to indicate the difference in the absorption of the energy by the sample before and after it is breathed, thus giving an indication of the proportion of the molecular oxygen consumed in the process.

6. The method of measuring the amount of molecular oxygen in a quantity of air consumed by an organism in breathing, comprising the steps of exposing a sample of air to be inhaled to electromagnetic energy of a wave length of 0.5 centimeter, measuring and recording the energy passed through the air, permitting the sample to be inhaled and exhaled by the organism, exposing a sample of air after exhaling to electromagnetic energy of the said wave length and measuring and recording the energy passed through the exhaled air, to give readings that may be compared to indicate the absorption of the energy by the sample before and after it is breathed, thus giving an indication of the proportion of the molecular oxygen consumed in the process.

7. Apparatus for determining the consumption of molecular oxygen in a sample of gas used in a process, comprising: means for generating electromagnetic energy of a critical wave length, characteristic of oxygen, at which a strongly selective absorption of said energy occurs, a chamber adapted to contain a sample of gas, means to introduce the sample of gas into the chamber before and after use in the process, means for propagating said energy through said chamber before and after the gas is used, and lasting record producing means for indicating the amount of electromagnetic energy transmitted through the sample both before and after the gas is used.

8. Apparatus for determining the consumption of molecular oxygen in a sample of gas used in a process, comprising: means for generating electromagnetic energy of a critical wave length, characteristic of oxygen, at which a strongly selective absorption of said energy occurs, said critical wave length being longer than about 0.1 centimeter, a chamber adapted to contain a sample of gas, means to introduce the sample of gas into the chamber before and after use in the process, means for propagating said energy through said chamber before and after the gas is used, and lasting record producing means for indicating the amount of electromagnetic energy transmitted through the sample both before and after the gas is used.

9. Apparatus for determining the consumption of molecular oxygen in a sample of gas used in a process, comprising: means for generating electromagnetic energy of a critical wave length, characteristic of oxygen, at which a strongly selective absorption of said energy occurs, said critical wave length being 0.5 centimeter, a chamber adapted to contain a sample of gas, means to introduce the sample of gas into the chamber before and after use in the process, means for propagating said energy through said chamber before and after the gas is used, and lasting record producing means for indicating the amount of electromagnetic energy transmitted through the sample both before and after the gas is used.

10. Apparatus for determining the consumption of molecular oxygen in a sample of air that is breathed by an organism comprising: means for generating electromagnetic energy of a critical wave length, characteristic of oxygen, at which a strongly selective absorption of said energy occurs, a chamber adapted to contain a sample of air to be breathed, means to introduce the sample of air into the chamber before and after use in breathing, means for propagating said energy through said chamber before and after the air is breathed, and lasting record producing means for indicating the amount of electromagnetic energy transmitted through the air both before and after breathing.

11. Apparatus for determining the consumption of molecular oxygen in a sample of air that is breathed by an organism comprising: means for generating electromagnetic energy of a critical wave length, characteristic of oxygen, at which a strongly selective absorption of said energy occurs, said critical wave length being longer than about 0.1 centimeter, a chamber adapted to contain a sample of air to be breathed, means to introduce the sample of air into the chamber before and after use in breathing, means for propagating said energy through said chamber before and after the air is breathed, and lasting record producing means for indicating the amount of electromagnetic energy transmitted through the air both before and after breathing.

12. Apparatus for determining the consumption of molecular oxygen in a sample of air that is breathed by an organism comprising: means for generating electromagnetic energy of a critical wave length, characteristic of oxygen, at which a strongly selective absorption of said energy occurs, said critical wave length being 0.5 centimeter, a chamber adapted to contain a sample of air to be breathed, means to introduce the sample of air into the chamber before and after use in breathing, means for propagating said energy through said chamber before and after the air is breathed, and lasting record producing means for indicating the amount of electromagnetic energy transmitted through the air both before and after breathing.

13. Apparatus for determining the consumption of molecular oxygen in a sample of gas used in a process, comprising: means for generating electromagnetic energy of a critical wave length, characteristic of oxygen, at which a strongly selective absorption of said energy occurs, a chamber adapted to contain a sample of gas, means to introduce the sample of air into the chamber before and after use in breathing, means for propagating said energy through said chamber before and after the gas is used, and continuous recording means for indicating the amount of electromagnetic energy transmitted through the sample.

14. Apparatus for determining the consumption of molecular oxygen in a sample of air that is breathed by an organism comprising: means for generating electromagnetic energy of a critical wave length, characteristic of oxygen, at which a strongly selective absorption of said energy occurs, a chamber adapted to contain a sample of air to be breathed, means to introduce the sample of air into the chamber before and after use in breathing, means for propagating said energy through said chamber before and after the air is breathed, and continuous recording means for indicating the amount of electromagnetic energy transmitted through the air.

References Cited in the file of this patent

UNITED STATES PATENTS

| | | |
|---|---|---|
| 2,463,297 | Muskat et al. | Mar. 1, 1949 |
| 2,467,211 | Hornfeck | Apr. 12, 1949 |
| 2,524,290 | Hershberger | Oct. 3, 1950 |
| 2,532,817 | Lafferty et al. | Dec. 5, 1950 |
| 2,565,230 | Hebler | Aug. 21, 1951 |

OTHER REFERENCES

Electrical Engineering, August 1948, pp. 735–740, article by Coles. (Copy in Div. 48.)

Journal of Applied Physics, June 1946, pages 495–500, article by Hershberger. (Copy in Div. 48.)

Instruments, January 1947, vol. 20, page 6. (Copy in Div. 48.)